(12) United States Patent
Lackner et al.

(10) Patent No.: US 12,434,748 B2
(45) Date of Patent: Oct. 7, 2025

(54) METHOD AND DEVICE FOR ASCERTAINING THE SURFACE QUALITY OF AT LEAST ONE RAIL HEAD

(71) Applicant: MATE GmbH, Kirchham bei Vorchdorf (AT)

(72) Inventors: Moritz Lackner, Steyrermuehl (AT); Daniel Ludwig Mihalic, Scharnstein (AT); Philipp Haselsteiner-Rafetseder, Hausmening (AT)

(73) Assignee: MATE GmbH, Kirchham bei Vorchdorf (AT)

( * ) Notice: Subject to any disclaimer, the term of this patent is extended or adjusted under 35 U.S.C. 154(b) by 109 days.

(21) Appl. No.: 18/289,442

(22) PCT Filed: May 6, 2022

(86) PCT No.: PCT/AT2022/060160
§ 371 (c)(1),
(2) Date: Nov. 3, 2023

(87) PCT Pub. No.: WO2022/232860
PCT Pub. Date: Nov. 10, 2022

(65) Prior Publication Data
US 2024/0367701 A1 Nov. 7, 2024

(30) Foreign Application Priority Data
May 6, 2021 (AT) .............................. A 50348/2021

(51) Int. Cl.
*B61K 9/10* (2006.01)
*G01B 11/30* (2006.01)

(52) U.S. Cl.
CPC .............. *B61K 9/10* (2013.01); *G01B 11/303* (2013.01)

(58) Field of Classification Search
CPC ......... B61K 9/08; B61K 9/10; B61L 15/0081; B61L 23/045; E01B 35/06; G01B 11/303; G01B 11/30; G01B 11/306
See application file for complete search history.

(56) References Cited

U.S. PATENT DOCUMENTS

| 4,075,888 A | 2/1978 | Buhler |
| 4,391,134 A | 7/1983 | Theurer et al. |

(Continued)

FOREIGN PATENT DOCUMENTS

| DE | 26 17 192 A1 | 11/1976 |
| DE | 30 47 667 A1 | 9/1981 |

(Continued)

OTHER PUBLICATIONS

International Search Report in PCT/AT2022/060160, mailed Jul. 18, 2022.

*Primary Examiner* — Peter B Kim
(74) *Attorney, Agent, or Firm* — Collard & Roe, P.C.

(57) ABSTRACT

A method and a measuring system for determining the surface condition on a rail head along a laid railway track formed by rails uses a measuring carriage and a measuring unit with at least a first measuring arrangement. The first measuring arrangement includes a measurement base carrier, a guide arrangement, and at least one first sensor located on the measurement base carrier. The measurement base carrier is guided in a movable manner relative to the carriage frame by the guide arrangement in a normal alignment with respect to a rail plane defined by one of the respective rails. Furthermore, the measurement base carrier including the at least one first sensor is mechanically supported on at least one of the rails by a supporting device during displacement of the measuring carriage, and is thus constantly guided at a predetermined, fixed distance above the rail.

22 Claims, 5 Drawing Sheets

(56) References Cited

U.S. PATENT DOCUMENTS

| | | |
|---|---|---|
| 4,548,070 A | 10/1985 | Panetti |
| 5,353,512 A | 10/1994 | Theurer et al. |
| 6,556,945 B1 | 4/2003 | Burggraf et al. |

FOREIGN PATENT DOCUMENTS

| | | | | |
|---|---|---|---|---|
| DE | 42 37 713 A1 | 5/1993 | | |
| DE | 100 03 675 A1 | 8/2001 | | |
| EP | 0844162 A1 * | 5/1998 | ............ | G01N 29/28 |
| EP | 0 986 732 B1 | 12/2003 | | |
| JP | H02-232402 A | 9/1990 | | |
| RU | 2717683 C1 | 3/2020 | | |

\* cited by examiner

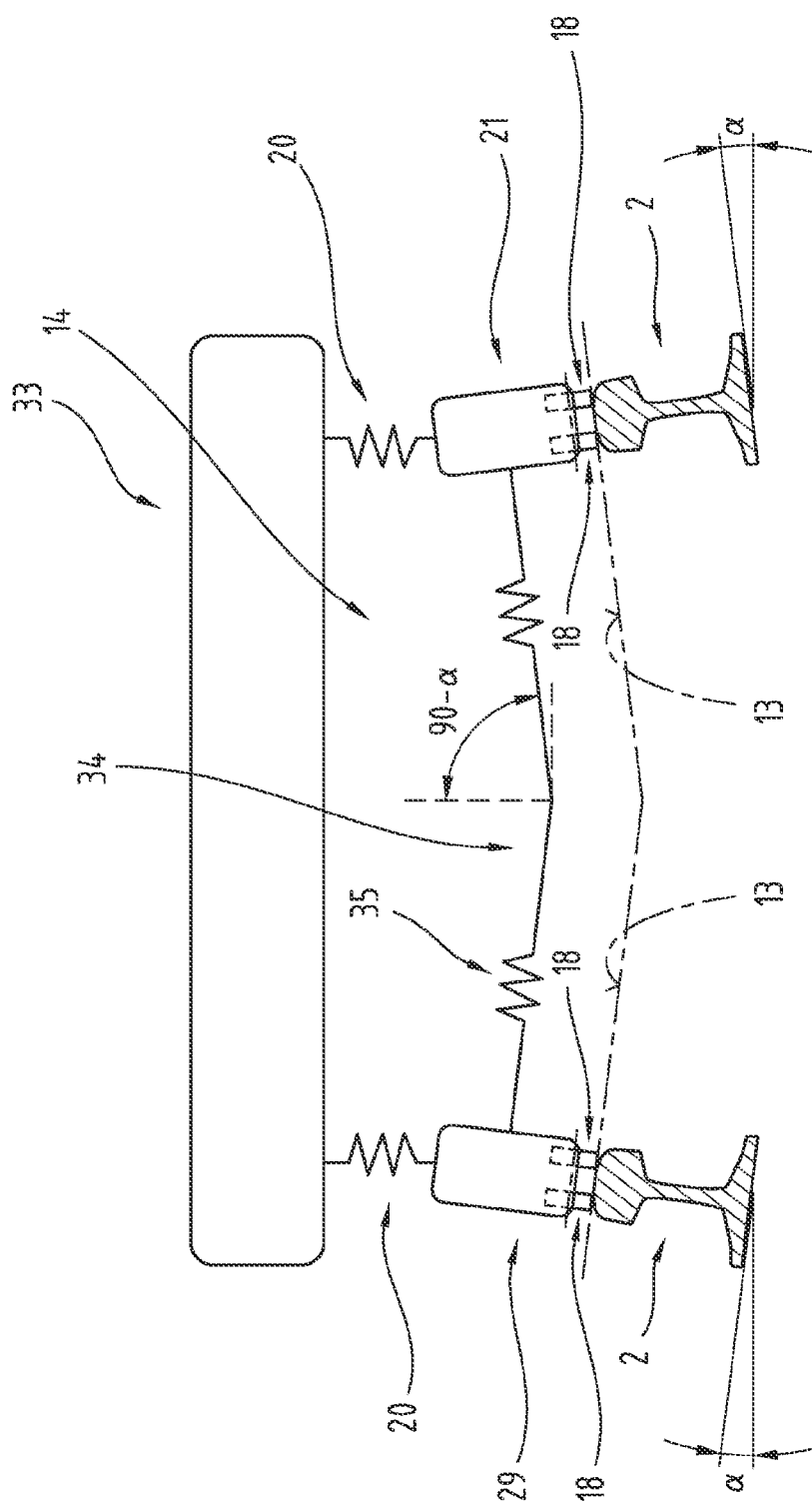

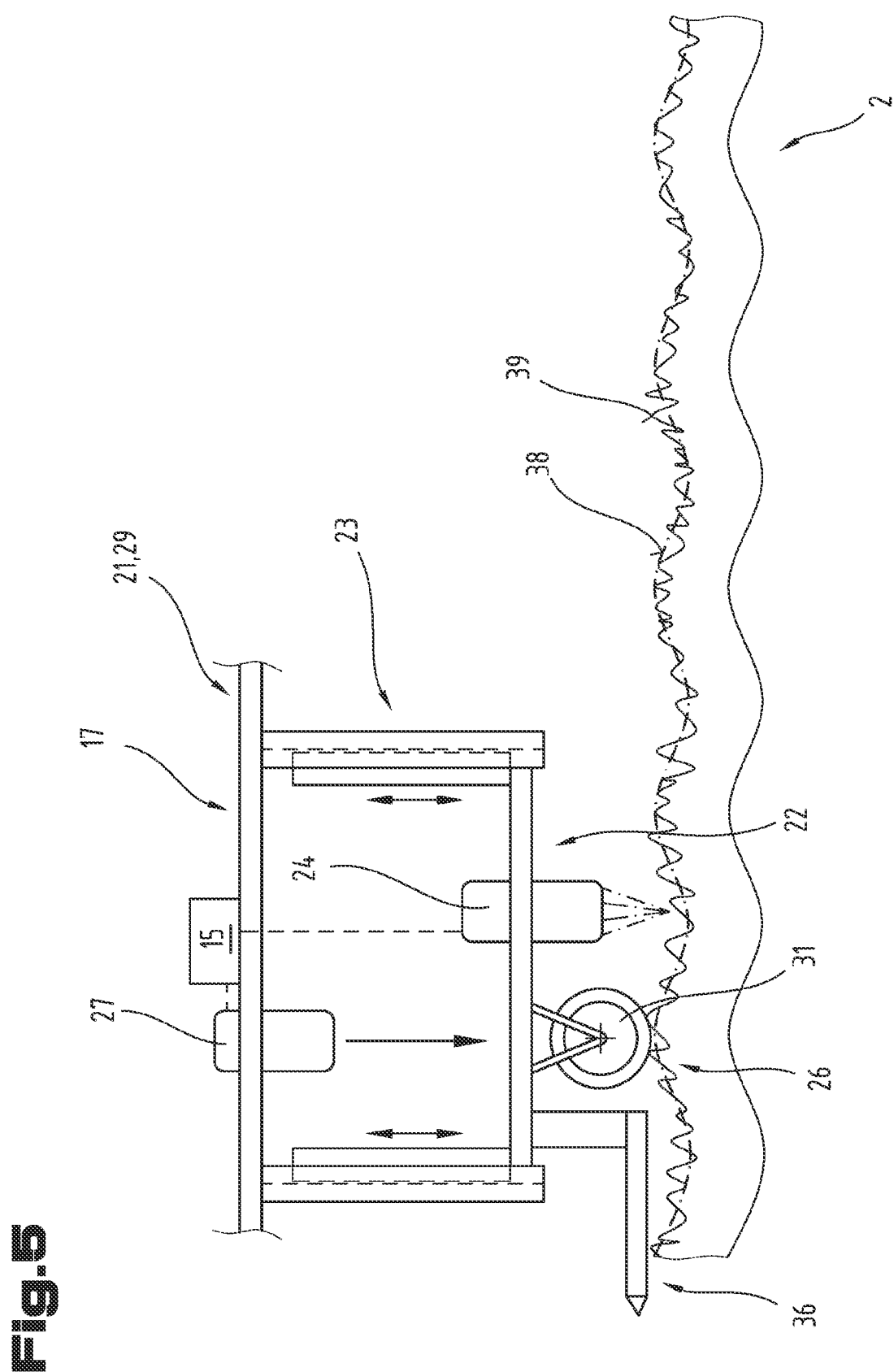

METHOD AND DEVICE FOR ASCERTAINING THE SURFACE QUALITY OF AT LEAST ONE RAIL HEAD

CROSS REFERENCE TO RELATED APPLICATIONS

This application is the National Stage of PCT/AT2022/060160 filed on May 6, 2022, which claims priority under 35 U.S.C. § 119 of Austrian Application No. A50348/2021 filed on May 6, 2021, the disclosure of which is incorporated by reference. The international application under PCT article 21(2) was not published in English.

BACKGROUND OF THE INVENTION

1. Field of the Invention

The invention relates to a method for determining the surface condition on at least one rail head, in particular on its running surface along a laid railway track formed by rails. The invention further relates to a mobile measuring system, which is configured to determine the surface condition on at least one rail head, in particular on its running surface along a laid railway track formed by rails.

2. Description of the Related Art

DE 42 37 713 A1 discloses a generically configured measuring arrangement for continuously measuring undulating unevenness of a rail. The measuring arrangement comprises wheel flanges that can be rolled on the track as well as a measuring carriage with a carriage frame and a distance detector arranged on the carriage frame for non-contact measurement of the distance from the rail. The distance detector, which operates as a non-contact distance meter and is configured as a laser distance meter, is connected via a signal line to a device for recording, processing and outputting measurement signals. One of the wheel flanges is configured as a path measuring wheel and is equipped with a priority encoder for outputting distance pulses, which are also forwarded to the device for processing via a signal line. Furthermore, the distance detector is mounted such that vibrations are absorbed in a linear guide connected to the carriage frame so as to be movable in the vertical direction with respect to the carriage frame. The distance detector is connected to an auxiliary mass, which in turn is mounted in a vertically movable manner on the linear guide by means of a soft spring, in particular an air spring, and a damper. The occurrence of vibrations and the associated free relative movement of the sensor with respect to the measuring surface on the rails led to inaccuracies or an adjustment outside the measuring range.

DE 100 03 675 A1 describes a device for measuring the driving surface roughness of rails during travel. The device comprises a distance measuring head with a radiation source and a radiation detector, wherein the radiation source can be used to apply electromagnetic radiation to the driving surface in question and the radiation reflected by the driving surface in question can be detected by the radiation detector. The device further has a setpoint height sensor that supplies a setpoint signal for a control module that corresponds to a setpoint height. The control module is connected to an adjustment motor of the vertical adjustment unit via a digital/analogue converter and a second control signal converter. The distance measuring head is connected to the control module via a first analogue/digital converter, to which the actual distance of the distance measuring head from the surface of the driving surface can thus be fed as an actual signal. The control module can be used to supply the adjusting motor of the vertical adjusting unit with control signals with a long averaging time in respect of the roughness of the driving surface in order to maintain a mean distance from the driving surface within a certain range of variation around the setpoint height. During the measurement processes, it was not always possible to maintain the distance between the radiation source and the rail surface at an exactly predetermined distance.

DE 2617192 discloses a method for measuring vertical deformations of railway tracks by displacing a device with track scanners as a measuring basis in the longitudinal direction of the tracks in order to measure the changes in undulation depth of each railway track. A plurality of measurement bases with decreasing measuring lengths are used, which are tiered such that, when evaluating each of the consecutive measuring bases depths measured by the corresponding scanners, at least those measurement gaps are filled in that occur at particular wavelengths in the aforementioned measuring bases, wherein a real error display is received for all desired wavelengths of the vertical deformations.

EP 0 986 732 B1 describes a method and a measuring device for measuring unevenness in the surface of an object formed by ripples and/or long undulation from a measuring platform, wherein the measuring platform and the object are moved relative to one another. In this case, the measuring device is installed on the measuring platform, which is moved along the rail at any speed, wherein the measuring platform with the measuring device is installed on the underside of a driven or towed measuring carriage. For accurate information about the unevenness of the driving surface, it is necessary for the measurement to be carried out at a fixed distance to the inside edge of the rail. The measuring platform is in turn movably positioned on the measuring carriage in the cross-sectional profile plane of the rail such that it can be moved relative to the rail in the vertical direction and transversely to the longitudinal direction of the rail. In addition, position sensors are arranged on the measuring platform, whose output signal is sent to a control computer. The control computer is connected to a drive system on the output side, by means of which the measuring platform can be adjusted by predetermined distances in the vertical direction and/or transversely to the longitudinal direction of the rail. Here, too, the exact distance between the measuring device and the rail surface could not always be maintained during the measuring processes.

SUMMARY OF THE INVENTION

The object of the present invention was to overcome the disadvantages of the prior art and to provide a method and a mobile measuring system by means of which a user is able to ensure reliable and constantly accurate positioning of the at least one sensor above the longitudinal profile of the rail during displacement of the measuring system along the rails.

This problem is solved by a method and a measuring system for determining the surface condition on at least one rail head according to the claims.

The method according to the invention is used to determine the surface condition on at least one rail head, in particular on its running surface, along a laid railway track formed by rails. For better and easier definition of different spatial directions, at least one rail plane defined by the respective rail is specified or defined in each case, which subsequently forms a respective reference plane, in particular for the relative adjustment of the measurement base support with respect to the carriage frame. In the case of a mutually horizontal and also vertical arrangement of the two associated rails, the rail planes are arranged extending in the common horizontal plane. Depending on the cross-sectional shape of the rail, the respective rail plane can represent a tangential plane adjacent to the respective longitudinal surface section to be determined. This is particularly the case if the rail has a curved running surface as seen in its cross section.

The following steps are provided for carrying out the determination and/or measurement method:

a measuring carriage with a carriage frame and wheels rotatably mounted on the carriage frame is provided, the carriage frame being supported by means of the wheels on at least one of the rails and being displaceable along the rails furthermore, a measuring unit having at least one first measuring arrangement with a measurement base carrier, a guide arrangement and at least one first sensor is provided, said at least one first sensor being arranged on the measurement base carrier. The guide arrangement itself being arranged on the carriage frame, the measurement base support further being guided by means of the guide arrangement in preferably normal alignment with respect to the respective rail plane, so as to be displaced relative to the carriage frame and Displacing the measuring carriage along the rails. During the displacement movement along the rails, the surface condition is determined on at least one rail head of at least one rail. The following is further provided the measurement base carrier along with the at least one first sensor is mechanically supported on or at the at least one rail by means of a support device during the displacement of the measuring carriage along the rails and during displacement of the measuring carriage by means of the support device and with respect to the respective support position of the support device on the rail, the at least one first sensor is always guided at a predetermined, fixed distance above the rail.

In the method steps selected here, it is advantageous to always ensure in this way that the measurement base carrier with the sensor positioned thereon is supported directly on a mechanical basis on the rail driving surface and guided along it. The direct, physical support ensures exact measurement always within the measuring range defined by the sensor. The measuring carriage is supported on the rail by means of its wheels, the wheels held on the carriage frame being spaced apart from one another at a predetermined distance as seen in the longitudinal direction of the rail. This is usually carried out in the front and rear end area of the carriage frame as seen in the direction of travel. A longer selected distance leads to sufficiently parallel alignment with respect to the longitudinal extension of the rail being achieved for the measuring carriage. This also prevents excessive tilting movements of the measuring carriage during a measurement journey due to possible unevenness or deviations from an imagined straight line for the most part.

A further procedure is advantageous, in which the support device of the measurement base carrier is formed by at least one support wheel. This allows smooth and secure support to be achieved. Furthermore, this can also prevent the support device from sticking to the rail surface, which can lead to the build-up of additional vibrations during forward movement and thus to inaccurate measurement results. Furthermore, the accuracy of the measurement result can be improved by supporting the wheel on the rail surface in a virtually or approximately linear or punctiform manner viewed in the direction of the axis of rotation.

A further advantageous procedure is characterized in that the at least one support wheel is formed by a ball bearing and the ball bearing is provided with a damping layer, in particular made of an elastomeric material, on its circumferential outer surface. In this way, high guiding accuracy can be achieved and vibration transmission from the rail to the supporting device and consequently also to the sensor can be reduced or even prevented.

A further method variant is advantageous, in which the wheels of the measuring carriage are formed by ball bearings and the ball bearings are each provided with a damping layer, in particular made of an elastomeric material, on their circumferential outer surfaces. In this way, vibration transmission from the rail to the entire measuring carriage can be reduced or even prevented.

It is further provided that the wheels are each arranged in pairs behind one another respectively on the measuring carriage in the direction of travel of the measuring carriage, and a first pair of wheels and at least a second pair of wheels are each formed by these. This enables reduction of the support load per wheel. Furthermore, the accuracy of the parallel guidance of the measuring carriage on the rail surface during the measurement journey can also be improved. However, this can additionally achieve a better and above all more tilt-proof measurement journey of the measuring carriage along the rail.

A further advantageous procedure is characterized in that the first pair of wheels is arranged at a first axial spacing from one another in the direction of travel of the measuring carriage, and the second pair of wheels is arranged at a second axial spacing from one another in the same direction, and the first axial spacing and the second axial spacing are selected to be different to one another by at least 20%. This achieves even better and more consistent guiding accuracy along an imagined straight line in the direction of the longitudinal extension of the rail.

In accordance with the invention, no natural number is formed by the ratio of the two axial spacings to one another. This means vibrations during the measurement journey can be further minimized or even prevented, thus achieving an even better and more accurate measurement result.

A further procedure is advantageous, in which the surface roughness on one of the rails is determined by the at least one first sensor. This makes it possible to determine first measured values for the surface condition of the rail on its running surface.

A further advantageous procedure is characterized in that the first measuring arrangement is equipped with at least one second sensor and, during the displacement of the measuring carriage along the rails, the relative displacement of the at least one first sensor relative to the carriage frame of the measuring carriage is determined by the at least one second sensor. By additionally providing a second sensor, undulation present in the longitudinal direction of the rail can thus be determined in conjunction with the path measurement. The relative movement of the first sensor, which is arranged or mounted on the measuring base support, with respect to the measuring carriage maps the longitudinal profile in the contact or bearing region of the supporting device on the rail.

Another method variant is advantageous, in which during displacement of the measuring carriage along the rails, the distance covered by the measuring carriage is determined by means of a path measuring device of the measuring unit. In this way, the respectively determined measured values can be assigned to an exact longitudinal position on the rail. Furthermore, the undulation of the rail surface along the longitudinal rail profile can also be exactly mapped.

Another procedure is characterized in that the path measuring device is formed or defined by its own path measuring wheel and/or by one of the wheels and/or by the at least one support wheel forming the support device.

A further procedure is advantageous, in which the measuring unit is further equipped with at least one second measuring arrangement, the second measuring arrangement being configured in the same way as the first measuring arrangement, and the surface condition of at least one of the two rails respectively being determined by the two measuring arrangements. This enables, for example, the ability to determine the different measured values or parameters for the surface condition simultaneously in one measurement journey along both rails of the associated rail track. However, it would still be possible to arrange the measuring arrangements behind one another and to support them on the respectively opposite rail with a support roller, for example, in order to prevent tilting.

A further advantageous procedure is characterized in that the measured values determined by the measuring unit are transmitted or forwarded to an evaluation device, and an evaluation or measurement protocol is generated from the measured values. This provides a record of the determined surface condition with its different measured values.

A method variant, in which the determination of the surface condition is carried out immediately following a machining operation on the at least one rail is also advantageous. This means that the result and the quality established can be determined immediately after the machining or re-machining process, in particular re-profiling, on the at least one rail.

However, the problem of the invention is also solved by a measuring system alone for determining the surface condition on at least one rail head. The measuring system is configured to carry out the determination, in particular on the running surface along a laid rail track formed by rails, and to form measured values in the process. At least one rail plane is respectively defined by the two rails located next to one another in the transverse direction, said rails being arranged extending in the common horizontal plane in the case of a mutually horizontal and also vertical arrangement of the two associated rails. The measuring system can be used in particular to carry out the method for determining the surface condition and comprises a measuring carriage with a carriage frame and wheels rotatably mounted on the carriage frame, wherein the carriage frame can be supported on the rails by means of the wheels and can be displaced along the rails a measuring unit having at least one first measuring arrangement with a measuring base support, a guide arrangement and at least one first sensor, said at least one first sensor being arranged on the measuring base support and the guide arrangement in turn being arranged on the carriage frame, wherein the measuring base support is further guided by means of the guide arrangement so as to be displaceable relative to the carriage frame, preferably in normal alignment relative to the rail plane, wherein provision is further made for the measurement base carrier with the at least one first sensor for determining the surface condition to be mechanically supported on at least one of the rails by means of a support device and for the at least one first sensor to always be guided at a predetermined, fixed distance above the rail during the displacement of the measuring carriage by means of the support device and with respect to the respective support position of the support device on the rail.

The resulting advantage is that it is always ensured that the measurement base carrier with the sensor located thereon can be supported directly on the rail surface on a mechanical basis and guided along it. The direct, physical support ensures exact measurement always within the measuring range defined by the sensor. The measuring carriage is supported on the rail by means of its wheels, the wheels being spaced apart from one another at a predetermined distance in the longitudinal direction of the rail. A longer selected distance leads to sufficiently parallel alignment with respect to the longitudinal extension of the rail being achieved for the measuring carriage. This also prevents excessive tilting movements of the measuring carriage during a measurement journey due to possible unevenness or deviations from an imagined straight line.

It can be further advantageous for the support device for the measurement base carrier to comprise at least one support wheel. This allows smooth and secure support to be achieved. Furthermore, this can also prevent the support device from sticking to the rail surface, which can lead to the build-up of additional vibrations during forward movement and thus to inaccurate measurement results. Furthermore, the almost linear support of the wheel on the rail surface can improve the accuracy of the measurement result.

Another embodiment is characterized in that the at least one support wheel is formed by a ball bearing and the ball bearing is provided with a damping layer on its circumferential outer surface, in particular made of an elastomeric material. In this way, high guiding accuracy can be achieved and vibration transmission from the rail to the supporting device and consequently also to the sensor can be reduced or even prevented.

A further possible embodiment has the features that the wheels of the measuring carriage are formed by ball bearings and the ball bearings are each provided with a damping layer, in particular made of an elastomeric material, on their circumferential outer surfaces. In this way, vibration transmission from the rail to the entire measuring carriage can be reduced or even prevented.

According to the invention, the wheels are each arranged in pairs behind one another on the measuring carriage in the direction of the direction of movement of the measuring carriage, and a first pair of wheels and at least a second pair of wheels are each formed thereby. This enables reduction of the support load per wheel. Furthermore, the accuracy of the parallel guidance of the measuring carriage on the rail surface during the measurement journey can also be improved. However, this can additionally achieve a better and above all more tilt-proof measurement journey of the measuring carriage along the rail.

It can further be advantageous for the first pair of wheels to be arranged at a first axial spacing from one another in the direction of travel of the measuring carriage, and the second pair of wheels to be arranged at a second axial spacing from one another in the same direction, the first axial spacing and the second axial spacing from one another being selected to differ by at least 20%. This achieves even better and more consistent guiding accuracy along an imagined straight line in the direction of the longitudinal extension of the rail.

This embodiment in accordance with the invention is characterized in that the ratio of the two axial spacings to one another does not form a natural number. This enables the minimization of vibrations of the measuring carriage during the measuring journey.

In a further embodiment, the at least one first sensor is configured to determine the surface roughness on one of the rails. This makes it possible to determine first measured values for the surface condition of the rail on its running surface.

Another embodiment is characterized in that the first measuring arrangement comprises at least one second sensor and the at least one second sensor is configured to determine the relative displacement of the at least one first sensor relative to the carriage frame of the measuring carriage during the displacement of the measuring carriage along the rails. By additionally providing a second sensor, undulation present in the longitudinal direction of the rail can thus be determined in conjunction with the path measurement. The relative movement of the first sensor, which is arranged or mounted on the measuring base support, with respect to the measuring carriage maps the longitudinal profile in the contact or bearing region of the supporting device on the rail.

A further preferred embodiment is characterized in that the measuring unit further comprises a path measuring device, said path measuring device being configured to determine the distance travelled by the measuring carriage during the displacement of the measuring carriage along the rails. In this way, the respectively determined measured values can be assigned to an exact longitudinal position on the rail. Furthermore, the undulation of the rail surface along the longitudinal rail profile can also be exactly mapped.

Furthermore, it can be advantageous for the measuring unit to further comprise a second measuring arrangement and for the second measuring arrangement to be configured in the same way as the first measuring arrangement. This enables, for example, the ability to determine the different measured values or parameters for the surface condition simultaneously in one measurement journey along both rails of the associated rail track. However, it would still be possible to arrange the measuring arrangements behind one another and to support them on the respectively opposite rail with a support roller, for example, in order to prevent tilting.

BRIEF DESCRIPTION OF THE DRAWINGS

The figures below elaborate on the invention to offer better understanding thereof.

The figures show in greatly simplified, schematic depiction:

FIG. 4 a cross section of the rail track with one respective measuring arrangement on one respective rail.

FIG. 5 a possible variant of the measuring carriage of the measuring system according to FIG. 2 with an exaggeratedly depicted rail surface in the direction of its longitudinal extension in side view.

DETAILED DESCRIPTION OF PREFERRED EMBODIMENTS

Figure 1:
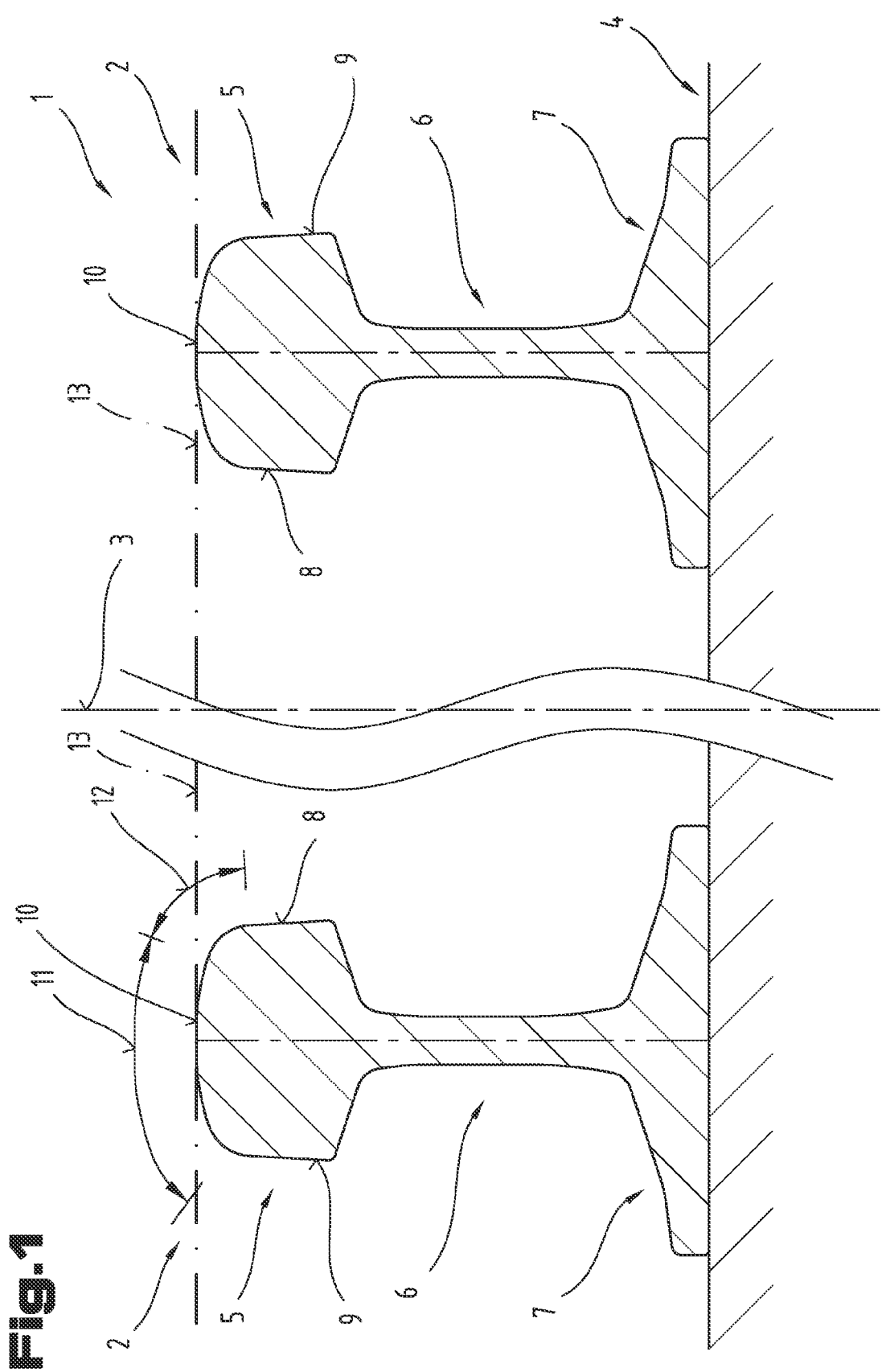
FIG. 1 a rail track with a possible profile of the rails in cross section and enlarged depiction.

It is worth noting here that the same parts have been given the same reference numerals or same component designations in the embodiments described differently, yet the disclosures contained throughout the entire description can be applied analogously to the same parts with the same reference numerals or the same component designations. The indications of position selected in the description, such as above, below, on the side etc. refer to the figure directly described and shown, and these indications of position can be applied in the same way to the new position should the position change.

The term "in particular" is understood in the following to be a possible, more specific configuration or further specification of subject matter or a method step but not necessarily to mean a mandatory, preferred embodiment of the same or a mandatory procedure.

In their present use, the terms "comprising", "has", "having", "includes", "including", "contains", "containing" and any variations thereof are intended to be non-exclusive in nature.

The further general term "wheel" encompasses all rotatably mounted objects, in particular those in the shape of a disc or roller, ideally with a circular contour. Depending on the thickness of the wheel in the direction of its axis of rotation, it can be configured as a disk or as a roller. The rotatably mounted objects themselves are rotatably mounted about an axis of rotation, the axis of rotation having a normal alignment with respect to the idealized circular plane. The wheel can comprise a fixed and stable wheel body as well as a coating arranged on the contour or its own damping layer, for example. It would also be possible to form the majority of the wheel from an elastomeric material.

FIG. 1 shows a cross section through a rail track 1 comprising at least one pair of rails 2, said rails 2 being arranged parallel to one another at a distance of one track width from one another. The rails 2 are mostly mounted at regular, preferably short intervals on sleepers 4 made of concrete, steel, wood or plastic, which are laid out transversely to a track axis 3, however the depiction of mounting elements has been dispensed with here. The track axis 3 forms a central axis, such that in the case of a horizontal arrangement of the two rails 2 with respect to one another in the central axis, a central plane can also extend in vertical alignment.

The term rail 2 of the rail track 1 is understood here to mean all rail parts or rail portions that serve to guide and/or support the rail vehicles that can be moved thereon. This also includes railroad switches, rail intersections and rail parts that do not extend in a straight line.

The two rails 2 each define a rail plane 13 on their upper sides or surfaces, which form or define a common horizontal plane when the rail web 6 of the rails 2 is arranged horizontally and also perpendicularly to one another. The rail plane 13 is indicated by a dash-dotted line. The central plane extending through the track axis 3 in turn has normal alignment with respect to the rail plane 13 and mostly or preferably encloses an angle of 90°, i.e. a right angle, with the latter. In the case of a transverse elevation such as curves or bends, for example, the rail plane 13 has a deviating alignment from the horizontal plane. Depending on the longitudinal extension of the rail, the respective rail plane 13 also has a certain longitudinal extension, which respectively defines a reference plane for the following description.

Along with the fastenings and the bedding, the rails 2 of the railway track 1 form the super-structure of the railway line. The rails 2 shown and described here fundamentally form linear supporting and guidance elements in rail transport and thus the predetermined track route for the rail vehicles thereon. It should be noted that the cross section of the rails 2 can be configured in a variety of ways and that this cross section has been chosen solely as an example.

When viewed in its cross section, each of the rails 2 comprises a rail head 5, a rail web 6 and a rail foot 7. In this case, the rail head 5 is supported by the rail web 6 and the rail foot 7 is mounted to the sleeper 4 or another support or base.

The part of the rail head 5 that can be touched by the wheels (not shown here) of a rail vehicle is referred to as running surface 10 in this context. The wheel flanges, not shown here, of the rail vehicles are each arranged on sides of the rails 2 facing each other, wherein these are also the sides that face the track axis 3 or a track center. The rail head 5 is laterally delimited by an inner side surface 8 and an outer side surface 9 arranged opposite thereto. When viewed in cross section, the profile portion extending between the side surfaces 8 and 9 can be referred to in the broadest terms as the running surface 10 of the rails 2. The running surface 10 of each rail 2 can be composed of a driving surface 11 and a driving edge 12. In this case, the driving surface 11 is arranged to extend along the upper side of the rail head 5, wherein the driving edge 12 forms the transition to the inner side surface 8 that faces the track center or track axis 3.

Over time, damage such as corrosion, wear, cracks, driving surface defects such as ripples, undulation, wheel skid spots, pitting, transverse profile changes such as flattening of cambered driving surfaces, burrs, bulges and the like occurs on the running surface 10 of laid rails 2. The manifestations of wear and/or damage, which are substantially restricted to the outer-most edge area of the running surface 10 viewed in cross section, can largely be rectified by a variety machining steps of the rail 2. A cutting machining method is predominantly used to remove the worn or damaged material of the rail head 5 on the surface of the rail 2 and the machined rail head 5 is restored to the target profile of the rail 2 to the greatest extent possible. This machining process can also be referred to as re-profiling.

When machining and/or profiling and/or re-profiling the running surface 10, in particular its running surface 11 and/or running edge 12, the machining can also extend beyond the running edge 12 over the inner side surface 8. However, it would also be possible to possibly additionally carry out the machining beyond the running surface 11 over the outer side surface 9. The possible machining methods are generally known from the prior art, wherein material removal is predominantly carried out by means of a milling process, for example, which is usually followed by a subsequent fine machining process.

Figure 2:
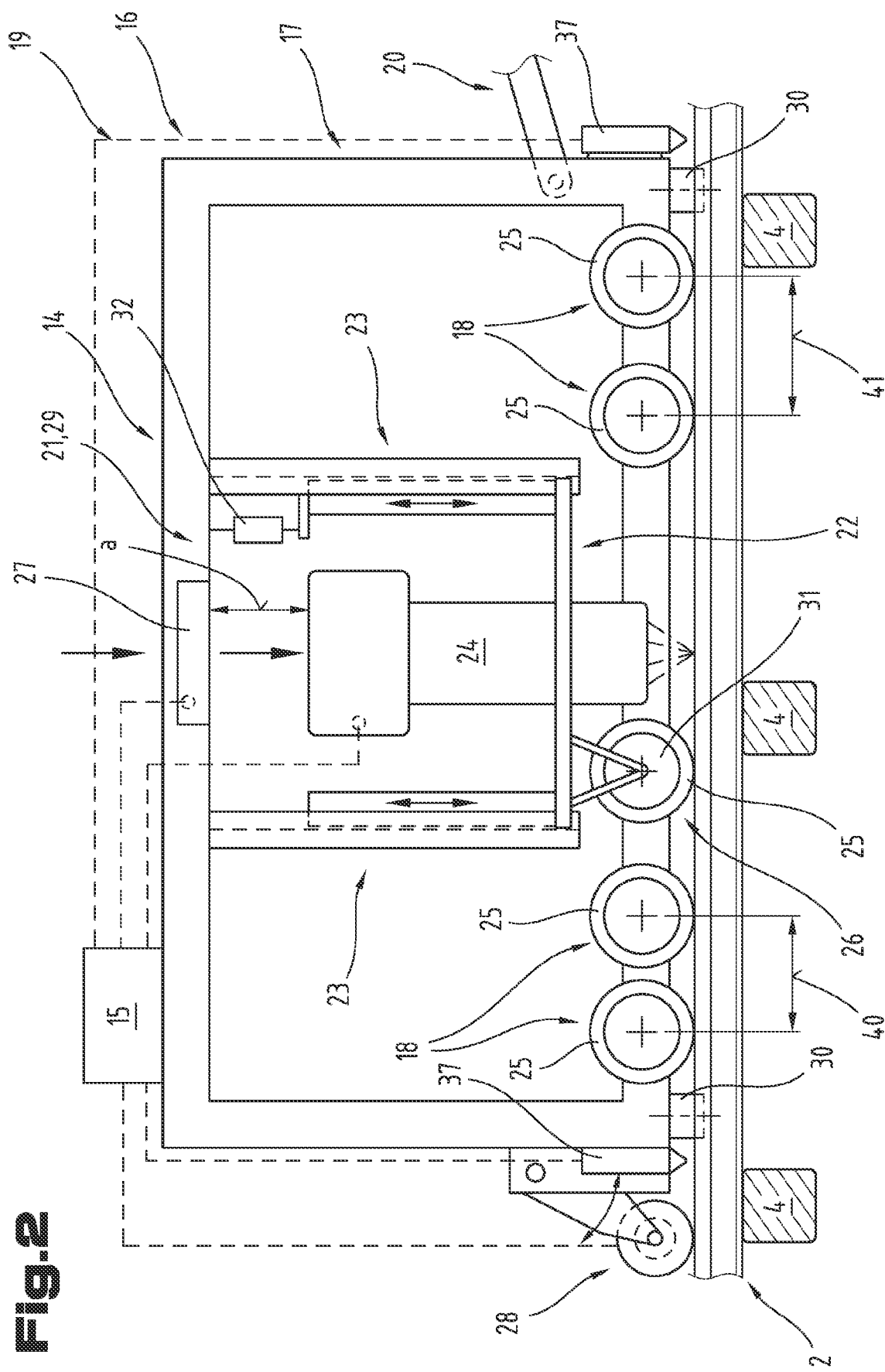
FIG. 2 a measuring system with a measuring carriage and a measuring unit with a first sensor supported on a mechanical basis on the rail during a measurement journey in side view.
Figure 3:
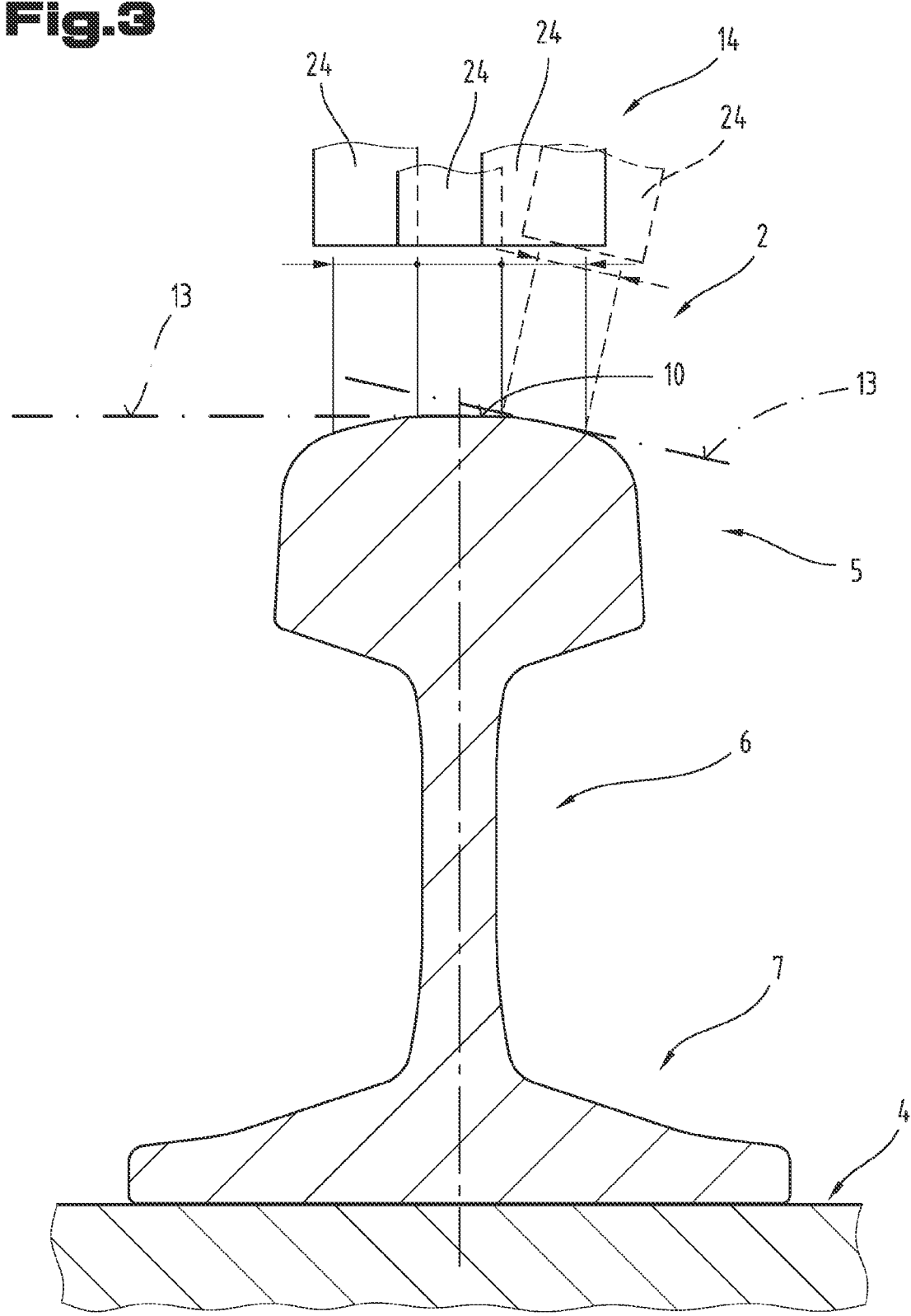
FIG. 3 a rail cross section with measuring tracks located next to one another in the transverse direction.

FIG. 2 shows a side view of a simplified schematic image of a measuring unit 14, whereas FIG. 3 shows the rail cross section. The measuring unit 14 serves or is configured to be able to determine the surface condition of at least one of the rails 2 but in particular of both rails 2 of the rail track 1 along the running surface 10. The term "surface condition" is understood to mean not only surface roughness, but also at least the undulation of the rail surface in the direction of its longitudinal extension. The above-described damage and/or plastic deformations of the rail material are also included if the measurement journey should be carried out before the start of the machining process.

The term "determination" is understood to mean the process of measuring and/or detecting one measured value and/or a plurality of measured values. A variety of measured values are determined by means of the measuring unit 14 described in more detail below and, if necessary, transmitted or forwarded to an evaluation device 15. The evaluation device 15 can be arranged directly on the measuring carriage 16 and/or also on the rail machining apparatus not shown in detail. The respective communication connections with the sensors and/or measuring devices have been indicated in dashed lines. The measured values can be stored in the evaluation device 15 and, if necessary, an evaluation or measurement protocol can be generated and output. This can take place in electronic and/or printed form.

The measuring unit 14 can be used to determine the respective surface condition with regard to damage and/or deformation caused by transport operation even before the machining operation. Furthermore, undulation in the direction of the respective longitudinal extension can also be determined. However, it is preferably provided that the result of the machining carried out, in particular re-profiling, on the at least one rail 2 be recorded and, if necessary, also documented for verification purposes.

The machining process, in particular re-profiling, is preferably carried out on the laid rail track 1 by means of a mobile rail machining apparatus during its movement along the rails 2, as is also sufficiently known from the prior art.

The measuring unit 14 can preferably be installed or arranged on a measuring carriage 16. The measuring carriage 16 itself can comprise a carriage frame 17 and a plurality of wheels 18 rotatably mounted on the carriage frame 17. As indicated in a simplified manner, the carriage frame 17 is or can be supported on the rails 2 by means of the wheels 18 and can also be displaced along the rails 2 for measurement journeys. Furthermore, the wheels 18 can each be arranged in pairs behind one another on the measuring carriage 16, wherein the pairs of wheels can be arranged spaced apart from one another in the longitudinal direction. Viewed in the transverse direction between the rails 2, the measuring carriage 16 with its carriage frame 17 is guided along and supported on the rails 2 by means of the wheels 18 in preferably parallel alignment with respect to the respective rail plane 13.

If the wheels 18 each form an associated pair of wheels and are arranged one behind the other in the direction of the longitudinal extension of the rails 2 or in the direction of movement of the measuring carriage 16, the spacing between the axles of the two wheels 18 of the associated pair of wheels should be considered. A respective axial spacing 40, 41 between the respective associated pairs of wheels should be selected depending on the number of wheels 18, their diameter and/or the total length of the measuring carriage 16. The first pair of wheels shown here is arranged in the left-hand end region of the measuring carriage 16 and the at least one second pair of wheels is arranged in the right-hand end region of the measuring carriage 16. A plurality of pairs of running wheels could also be arranged one behind the other in the direction of the longitudinal extension of the rails 2 or in the direction of movement of the measuring carriage 16.

In this way, it can be provided that a first axial spacing 40 of the first pair of wheels with respect to the second pair of wheels arranged at a distance therefrom in the direction of the longitudinal extension of the rails 2 or in the direction of movement of the measuring carriage 16 is selected to be different by at least 20% therefrom with its second axial spacing 41. Furthermore, the first axial spacing 40 and the second axial spacing 41 should not form an integral multiple of one another. This is intended to avoid forming a natural number from the ratio of the two axial spacings 40, 41 to one another.

Furthermore, FIG. 4 below indicates that, in the transverse direction with respect to the longitudinal extension of the rails 2 or in the direction of movement of the measuring carriage 16, arrangement in pairs can be carried out additionally with each of the wheels 18 preferably next to one another. Spacing in the transverse direction depends on the rail profile. The two wheels 18 may be arranged on a common physical wheel axle. However, mounting of each of the wheels 18 individually on the carriage frame 17 of the measuring carriage 16 would also be possible. If both a first pair of wheels and a second pair of wheels are provided in the direction of the longitudinal extension of the rails 2 or in the direction of movement of the measuring carriage 16, and if each of the wheels 18 is also arranged next to each other viewed in the transverse direction, both the first and second pair of wheels respectively comprise a total of four wheels 18. This can be provided for each measuring carriage 16 such that the wheels 18 of each measuring carriage 16 are respectively supported on the same rail 2.

In the embodiment shown, a measuring system 19 comprises or is formed by at least the measuring unit 14 and the measuring carriage 16. The measuring carriage 16 with the measuring unit 14 can be configured as an independent structural unit and can be coupled to the rail machining apparatus machine not shown in detail by means of a coupling device 20, such as a coupling rod, and can thus be moved in a movement-connected manner in the direction of movement. In order to transmit vibrations from the rail machining apparatus or another rail vehicle configured as a traction engine, the coupling device 20 itself can be formed from a material that has vibration-damping properties. This could be air bellows, a rubber band or the like. The arrangement of the entire measuring system 19, in particular of the measuring carriage 16 with the measuring unit 14, can take place inside or below the rail machining apparatus or can also be provided downstream of the latter viewed in the direction of travel.

The measuring unit 14 comprises at least one first measuring arrangement 21 with a measuring base carrier 22, a guide arrangement 23 and at least one first sensor 24. The at least one first sensor 24 is arranged on or attached to the measurement base carrier 22. The at least one first sensor 24 is preferably designed to determine the surface roughness on one of the rails 2. The determination of the measured value or values should be without contact. A chromatic confocal sensor can be used for this purpose, for example, which can also be referred to as a white light sensor. Such sensors 24 utilize the properties of dispersive optics in order to split the white light generated into different wavelength components and to refract it to varying degrees. This results in several focal points at different distances from the respective sensor 24. Depending on the sensor, this can result in different measurement ranges and resolutions, wherein the measurement range can be within a value range with a lower limit of 0.1 mm, in particular 1.0 mm, and an upper limit of 20.0 mm, preferably 2.0 mm.

It should be noted that, viewed in the longitudinal direction of the rail, a plurality of the first sensors 24 can also be provided next to one another in the transverse direction of a rail 2. Depending on the dimensions thereof, a direct sequential arrangement of a plurality of the first sensors 24 is conceivable and possible. By doing so, a plurality of measuring tracks or measuring strips located next to one another in the transverse direction can be formed on one of the rails 2. This can best be seen in FIG. 3, which shows one of the rails 2 in cross section. Three measuring tracks or measuring strips arranged next to one another in the transverse direction have been indicated and visualized by means of dimension arrows. The first sensors 24 have been indicated above the running surface 10. The arrangement of the measuring tracks or measuring strips on the rail 2 is usually defined in a standard and the arrangement thereof with respect to a reference area must be observed in accordance with these specifications.

The sensors 24 can be aligned such that they are all preferably normally aligned relative to the rail plane 13 tangent to the running surface 10 at its highest point on the rail 2.

However, it would also be possible to arrange the reference plane defined by the respective rail plane 13 viewed in cross section as a tangential plane on the respective rail geometry.

This is especially the case with a convexly curved running surface 10 in the area of the respectively provided measuring track or the measuring strip of the respective sensor 24 on the rail 2.

For the sensor 24 shown on the right in FIG. 3, the relevant further rail plane 13 is indicated as a tangential plane approximately in the middle of the width of its measuring portion. This sensor 24 can be guided and adjusted in a normal direction to the further rail plane 13. An inclination adjustment of the respective sensor 24 in the transverse direction with respect to the longitudinal extension of the rail can be provided for this purpose. However, an inclined alignment and arrangement of the measuring carriage 16 and a parallel alignment of its wheel axes with respect to the respective rail plane 13 would also be conceivable and possible.

The guide arrangement 23 itself is arranged on or fastened to the carriage frame 17 and serves or is configured to guide the measurement base carrier 22 so as to be displaceable relative to the carriage frame 17. The guide arrangement 23 is preferably a guiding device in each case configured as a linear guide in order to be able to form a rectilinear longitudinal guide. The interacting guide elements of the respective guiding device of the guide arrangement 23 can, for example, be arranged at a distance from one another in the longitudinal direction of the carriage and thus form high guidance quality. This running particularly smoothly and without canting.

The measurement base carrier 22 is guided in a movable manner relative to the carriage frame 17 by means of the guide arrangement 23 in a normal alignment with respect to the respective rail plane 13 defined by the two rails 2. A parallel guidance of the measurement base carrier 22 with respect to a vertical axis of the rail or the rail web 6 can thus be achieved. The reference plane for the adjustment movement of the measurement base carrier 22 can, however, also be defined by the carriage frame 17 itself or by the individual wheels 18 in the area of their rotational or bearing axis, or also by their bottom circumferential surfaces.

Furthermore, it would also be possible to arrange the at least one first sensor 24 in a pivotable or tiltable manner on the measurement base carrier 22. An adjustment possibility of the sensor 24 in transverse direction with respect to the longitudinal extension of the rails could be created or provided. The greatest variation of positions and/or alignments of the respective sensor 24 on the rail 2 to be measured could then be configured. This can be required, for example, if the rails 2 are arranged tilted against one another.

The wheels 18 of the measuring carriage 16 can be formed from bearings, for example, in order to achieve exact positioning with low space requirements. To avoid a direct hard support (iron on iron) of the wheels 18 on the rails 2, the bearings forming the wheels 18 can each be provided with an additional damping layer 25 on their circumferential outer surfaces. The damping layer 25 can be made of an elastomeric material. Such materials have a rather low or very low elastic modulus. The elastic modulus can be within a range with a lower limit of 5 N/mm$^2$, in particular 10 N/mm$^2$, and an upper limit of 100 N/mm$^2$, in particular 80 N/mm$^2$.

Materials such as rubber elastomers, elastomers or silicones can be used. By providing the damping layer 25, an interruption-free measurement of the rail 2 can be performed without vibrations and/or oscillations emanating from the rail profiling unit being transferred to the measuring unit 14 during the machining process(es). Sufficient damping effect can thus be achieved by decoupling the measuring carriage 16 from the rails 2.

A further separation or decoupling is performed by providing a separate measuring system 19 with its measuring carriage 16 and the measuring unit 14 thereupon. The measuring carriage 16 can thus be configured with sufficient own mass. The previously described coupling device 20 serves to convey and move the measuring system 19 with the machining apparatus machine or another rail vehicle and can itself be configured such that a transfer of oscillations or vibrations coming from the rail machining apparatus can largely be prevented.

Furthermore, the measuring unit 14 also comprises a supporting device 26, by means of which the measurement base carrier 22 including the at least one first sensor 24 is mechanically supportable or supported on at least one of the rails 2. By means of the supporting device 26, the at least one first sensor 24 can be constantly guided at a predetermined, fixed distance above the rail 2 during the displacement of the measuring carriage 16 in the longitudinal direction of the rail. This is performed during the measuring journey. The supporting device 26 is connected with or arranged on the measurement base carrier 22 and comprises at least one wheel which can also be referred to as the support wheel 31. The at least one support wheel 31 can, for example, be formed by a ball bearing. The outer circumferential surface of the ball bearing can also be provided with or coated in the previously described damping layer 25, in particular made of an elastomeric material. The wheel or the support wheel 31 could, however, also be predominantly made of an elastomeric material with sufficient dimensional stability and/or strength. The smaller the diameter of the wheel or support wheel 31, the more precisely the first sensor 24 can be guided along the undulation of the rail 2.

If no measuring journey is to be performed, the measurement base carrier 22 including the supporting device 26 can be lifted off the rail 2, wherein this can be performed along the guide arrangement. For the sake of better clarity, the adjusting and/or locking means are not depicted here.

In order to be able to determine the undulation of the rail surface, in particular of the running surface 10, of at least one of the rails 2 in the direction of its longitudinal extension, the first measuring arrangement 21 can also further comprise at least one second sensor 27. The at least one second sensor 27 is configured or provided such that it can determine the relative displacement of the at least one first sensor 24 with respect to the carriage frame 17 of the measuring carriage 16 during the displacement of the measuring carriage 16 along the rails 2. The measurement or determination of the relative displacement can or ought preferably be performed without contact, wherein the second sensor 27 can be formed by a distance sensor, for instance. The constant distance between the second sensor 27 and the first sensor 24 determined during the measuring journey is represented by the letter "a".

It would, however, irrespective thereof or in addition thereto, also be possible to indirectly determine the relative displacement between the measurement base carrier 22 and the carriage frame 17 during the displacement of the measuring carriage 16 along the rails 2. Furthermore, the relative displacement between the interacting guide elements of the guide arrangement 23 could, however, also be determined. In any case, this also corresponds to the relative displacement of the at least one first sensor 24 with respect to the carriage frame 17 of the measuring carriage 16. The respective relative distance is directly determined with the first measuring method as described above, whereas the second measuring method indirectly measures said relative distance via the measurement base carrier 22 with the attached first sensor 24 and/or between the guide elements.

In some operating cases, such as if the own mass or own inertia of the entire measurement base carrier 22 including the further components found thereon, e.g. the guide arrangement 23, the supporting device 26, is too low and this leads to additional relative displacements of the measurement base carrier 22 with respect to the carriage frame 17 depending on undulation and/or travel speed of the measuring carriage 16, it can be necessary to provide at least a control and/or damping organ 32. FIG. 2 indicates a control and/or damping organ 32 which is represented in operation between the carriage frame 17 and a guide element of the guide arrangement 23. The control and/or damping organ 32 can, inter alia, be configured or provided to effect a compression force when supported on the carriage frame 17 on the supporting device 26 and thus subsequently an advancement along the rail 2. Additional undesired vibrations can thus be minimized or prevented and a distortion of the measurements can thereby be largely or entirely prevented.

The control and/or damping organ 32 can also further serve or be configured to lift the measurement base carrier 22 including the supporting device 26 and the first sensor 24 from the rail 2. An additional further control and/or damping organ 32 could, however, also be provided for this adjustment movement. The relative adjustment movement is performed by means of the guide elements of the guide arrangement 23. The control and/or damping organ 32 can, for example, be formed by a spring, a cylinder piston arrangement, a magnet arrangement, or similar.

In order to obtain a reference of the determined undulation to its longitudinal position on the rail 2, the measuring unit 14 can further comprise a path measuring device 28. The path measuring device 28 is configured to determine the path covered by the measuring carriage 16 during the displacement of the measuring carriage 16 along the rails 2.

A possible example embodiment of the path measuring device 28 could be a separate path measuring wheel. It would, however, also be possible to form the path measuring device 28 from one of the wheels 18 or to provide such a device on one of the wheels 18. Furthermore, it would, however, also be possible to provide or arrange the path measuring device 28 on the supporting device 26 of the measurement base carrier 22 if it is formed by at least one support wheel 31.

Preferably, the first measuring arrangement 21 with the at least one first sensor 24 and where necessary also the second sensor 27 as well as the path measuring device 28 is assigned to one of the rails 2. In order to be able to also determine the aforementioned measurements on the opposite further rail 2, the measuring unit 14 can further comprise a second measuring arrangement 29.

A significantly simplified representation in FIG. 4 shows the possible adjacent arrangement of each of the measuring arrangements 21, 29 on each of the rails 2. A traction engine 33, which can be formed by a rail machining apparatus, for instance, which carries the entire measuring unit 14 is simply depicted as a rectangle, wherein for the sake of improved clarity its support on the rails 2 has not been depicted.

The rail plane 13 of each of the rails 2 is defined, wherein when viewed cross-sectionally each of the rail planes has a normal alignment with respect to the respective rail web 6. The inclined position or slant results from the tilted arrangement of the rails 2, wherein in this case the two rail planes 13 are aligned in a sloping and converging manner when viewed in the direction of the track center.

In order to achieve a crosslink between the two measuring arrangements 21, 29, a cross-linking organ 34 is shown in a simplified representation. The crosslinking organ 34 connects the two measuring arrangements 21, 29 and can serve to balance out or adjust to the different gauges. Furthermore, the crosslinking organ 34 can also comprise a damping element 35 in order to keep the transfer of vibrations between the two measuring arrangements 21, 29 as low as possible.

The coupling device 20 can be provided between each of the measuring arrangements 21, 29 and the traction engine 33 to achieve joint movement.

The second measuring arrangement 29 can preferably be configured or constructed identically to the first measuring arrangement 21 and comprise the same assembly components. For the sake of better clarity, FIG. 2 does not depict the second measuring arrangement 29 separately, although the reference numeral 29 has been entered next to reference numeral 21 representing the first measuring arrangement 21. This is due to the fact that the second measuring arrangement 29 in the side view selected for FIG. 2 is behind and thus next to the first measuring arrangement 21. The second measuring arrangement 29 thus constitutes an individual arrangement for determining or measuring the surface condition. Preferably, at least one of the measuring arrangements 21, 29 is assigned to each of the two rails 2 and together they form the measuring unit 14. It would, however, also be possible to arrange the at least two measuring arrangements 21, 29 behind one another and only perform the measuring process on one of the rails 2.

The two measuring arrangements 21, 29 each supported on one of the rails 2 can be coupled with one another, wherein an additional gauge balance is also conceivable. A mutual inclination adjustment to one another is also possible. This is represented by the right angle of 90° as depicted and reduced by the alpha angle.

Furthermore, FIG. 2 also shows that at least one further sensor 37 can be provided on the carriage frame 17, preferably however several further sensors 37. The further sensor 37 is configured or provided such that it can determine the relative spatial location and position of the carriage frame 17, and the guidance of the entire measuring system 19 with respect to unevennesses and/or of the supporting device 26, in particular its support wheel.

In FIG. 5, a possible further and potentially independent embodiment of the measurement base carrier 22 guided adjustably on the carriage frame 17 is shown, again using the same reference numerals or component designations for the same parts as in the preceding FIGS. 1 to 3. To avoid unnecessary repetition, reference is made to the detailed description in the preceding FIGS. 1 to 3.

The representation form is selected stylistically, wherein the supporting device 26 with the support wheel shown here on the measurement base carrier 22 can also further comprise a skid 36. The skid 36 forms a further component of the supporting device 26 and can constitute a mechanical emergency safety means. By guiding the skid 36 along the rail 2, a collision of the sensor 24 with the surface of the rail 2 can be prevented. This can be the case if the supporting device 26 is configured in particular as a support wheel and rolls across a rail joint and thus partially enters the gap in the rail joint. To a certain extent, an excessive approach of the sensor 24 to the rail 2 and thus a further relative movement in the direction of the rail 2 can be prevented.

The second sensor 27 determines the relative displacement of the measurement base carrier 22 with respect to the carriage frame 17.

Furthermore, beneath the measurement base carrier 22 only the longitudinal profile of the rail 2 to be measured and determined is represented in a significantly exaggerated manner as a partial section of the rail 2. In a first diagram line 38, the undulation of the rail 2, namely the height deviation of a straight line with respect to the determined or measured path, is thereby shown. The surface roughness along the rail surface in longitudinal direction of the same with its undulation according to the first diagram line 38 is also shown in a significantly exaggerated manner in a second diagram line 39. The second diagram line 39 describes or shows the superposition of the undulation and the surface roughness.

Several different signals and thus corresponding different measurements relative to the rails 2 are recorded and/or determined during the measuring journey or the relative movement of the measuring system 19 with the measuring carriage 16, the sensors 24, 27, and the path measuring device 28, which also comprises a sensor or detector.

The surface roughness is determined by the first sensor 24, wherein this is transferred to the evaluation device 15 in time-dependent signals. The path covered is determined by the path measuring device 28 and time-dependent path signals for the measuring path are also sent to the evaluation device 15. Finally, to determine the undulation of the rail surface in its longitudinal extension, the relative displacement of the first sensor 24 or of the measurement base carrier 22 with respect to the carriage frame 17 is constantly determined by the second sensor 27 and time-dependent undulation signals are sent to the evaluation device 15. The individual time-dependent signals are combined to generate a path-dependent signal which can be depicted in a diagram as a real longitudinal profile on the rail 2 both with its undulation and its surface roughness.

If a measuring journey is performed, the various measurements determined by the measuring unit 14 are transferred or forwarded to the evaluation device 15. This is preferably done independently for each rail 2. The respective measurements can relate to the surface roughness, the relative movement between the at least one first sensor 24 or the measurement base carrier 22 carrying the sensor and the carriage frame 17, the path covered along the rails 2, and where applicable the measurements from the further sensor 37. The undulation of the respective rail 2 along its longitudinal extension and the exact longitudinal position can be determined with the respective measurement of the relative position of the first sensor 24 with respect to the carriage frame 17 and the path covered along the rails 2. The respective communications connections for transmitting the determined or measured values have been indicated with dashed lines. The communications connections can be wireless and/or cabled. Inter alia, a constant roughness profile along the rails 2 can thus be generated and documented with the at least one first sensor 24. As described above, the undulation is determined by the interaction of the path measuring device 28 with the measurement of the relative displacements of the first sensor 24 with respect to the carriage frame 17.

Once this has occurred, an evaluation or measurement report can be generated from the individual measurements and where necessary issued. As already mentioned, the measuring journey and thus the determination of the surface condition should preferably be performed immediately following the machining process on the at least one rail 2. The exact current condition can thus be determined and where necessary documented immediately following the performed subsequent machining. Furthermore, this provides the opportunity to interrupt the machining process, in particular the reprofiling process, in case of a machining result which is unsatisfactory or deviates from the standard, and then immediately subject the respective rail section which does not fulfil the requirements to a further machining process.

At least the following steps shall be performed to carry out the method to determine the surface condition on at least one rail head 5 along the laid railway track 1 formed by the rails 2:

provision of the measuring carriage 16 with its carriage frame 17 and the rotatably mounted wheels 18 on the carriage frame 17, wherein the carriage frame 17 is supported by means of the wheels 18 on the rails 2 and is displaceable or movable along the rails 2, provision of the measuring unit 14 with the at least one first measuring arrangement 21 with the measurement base carrier 22, the guide arrangement 23 and the at least one first sensor 24, said at least one first sensor 24 being arranged on the measurement base carrier 22 and the guide arrangement 23 being arranged on the carriage frame 17, wherein furthermore the measurement base carrier 22 is preferably guided by means of the guide arrangement 23 in a displaceable way in a normal alignment with respect to the respective rail plane 13 relative to the carriage frame 17, provision of the supporting device 26 and the mechanical support of the measurement base carrier 22 including the at least one first sensor 24 by means of the supporting device 26 during the displacement of the measuring carriage 16 along the rails 2, displacement of the measuring carriage 16 along the rails 2 and thereby determination of the surface condition on at least one rail head 5 of at least one rail 2, and further constant guiding of the at least one first sensor 24 during the displacement of the measuring carriage 16 by means of the supporting device 26 at a predetermined, fixed distance above the rail 2. The predetermined, fixed distance of the first sensor 24 relates to the respective and current support position or the contact area of the supporting device 26 on the rail 2.

The measuring carriage 16, which is supported movably on the rails 2 by means of the wheels 18, can additionally also be guided along by means of several lateral guide rollers 30 in parallel alignment with respect to the longitudinal extension of the rail. The lateral guide rollers 30 can replace the otherwise usual wheel flange for the guidance in transverse direction with respect to the track axis 3 and, for example, come into contact on the inner side surface 8 of each of the rails 2. An adjacent arrangement of the lateral guide rollers 30 is also conceivable. Where required, the lateral guide rollers 30 can be arranged and held on the carriage frame 17 in an adjustable manner thereto. This serves to be able to prevent collisions at railroad switches or intersections, for instance. The relative adjustment can, for example, occur or be performed by a pivot process, a height adjustment to the side facing away from the rail 2, or similar.

The example embodiments show possible embodiment variations, although it is to be noted here that the invention is not limited to the specifically represented embodiment variations of the same, but rather various combinations of the individual embodiment variations with one another are possible, and that given the technical teachings provided by the present invention this variation possibility is within the ability of the skilled person in this technical field.

The scope of protection is defined by the claims. The description and the drawings should, however, be consulted when construing the claims. Individual features or combinations of features from the various example embodiments as shown and described can constitute separate inventive solutions. The problem to be solved by the individual inventive solutions can be derived from the description.

All value ranges specified in the current description are to be understood such that they include any and all sub-ranges, e.g., the specification 1 to 10 is to be understood such that all sub-ranges, starting from the lower limit 1 and the upper limit 10 are included, i.e., all sub-ranges begin with a lower limit of 1 or more and end at an upper limit of 10 or less, e.g., 1 to 1.7, or 3.2 to 8.1, or 5.5 to 10.

As a matter of form and by way of conclusion, it is noted that, to improve understanding of the structure, elements have partially not been shown to scale and/or enlarged and/or shrunk.

LIST OF REFERENCE NUMERALS

1 Railway track
2 Rail
3 Track axis
4 Sleeper
5 Rail head
6 Rail web
7 Rail foot
8 Inner side surface
9 Outer side surface
10 Running surface
11 Driving surface
12 Driving edge
13 Rail plane
14 Measuring unit
15 Evaluation device
16 Measuring carriage
17 Carriage frame
18 Wheel
19 Measuring system
20 Coupling device
21 First measuring arrangement
22 Measurement base carrier
23 Guide arrangement
24 First sensor
25 Damping layer
26 Supporting device
27 Second sensor
28 Path measuring device
29 Second measuring arrangement
30 Lateral guide roller 31 Support wheel
32 Control and/or damping organ
33 Traction engine
34 Crosslinking organ
35 Damping element
36 Skid
37 Further sensor
38 First diagram line
39 Second diagram line
40 First axial spacing
41 Second axial spacing

The invention claimed is:

1. A method for determining the surface condition on at least one rail head, along a laid railway track formed by two rails, wherein at least one rail plane is defined by the two rails, and wherein the following steps are performed:
provision of a measuring carriage with a carriage frame and rotatably mounted wheels on the carriage frame, wherein the carriage frame is supported by means of the wheels on at least one of the rails and is displaceable along the rails,
provision of a measuring unit with at least a first measuring arrangement with a measurement base carrier, a guide arrangement and at least one first sensor, said at least one first sensor being arranged on the measurement base carrier and the guide arrangement being arranged on the carriage frame, and
displacement of the measuring carriage along the rails and thereby determining the surface condition on at least one rail head of the at least one rail,
wherein during the displacement of the measuring carriage, the measurement base carrier including the at least one first sensor is mechanically supported on the at least one rail by means of a supporting device, and
during the displacement of the measuring carriage, the at least one first sensor is constantly guided at a predetermined, fixed distance above the rail by means of the supporting device and with respect to the respective support position of the supporting device on the rail,
wherein the wheels are arranged in pairs one behind the other on the measuring carriage in the direction of travel of the measuring carriage and of these a first and at least a second pair of wheels is formed, wherein the first pair of wheels is arranged at a first axial spacing from one another in the direction of travel of the measuring carriage and the second pair of wheels is arranged in the same direction at a second axial spacing from one another and wherein a ratio of the two axial spacings to one another does not form a natural number.

2. The method according to claim 1, wherein the supporting device of the measurement base carrier is formed by at least one support wheel.

3. The method according to claim 2, wherein the at least one support wheel is formed by a ball bearing and the ball bearing is provided with a damping layer on its circumferential outer surface.

4. The method according to claim 1, wherein the wheels of the measuring carriage are formed by ball bearings and the ball bearings are provided with a damping layer on their circumferential outer surface.

5. The method according to claim 1, wherein the first axial spacing and the second axial spacing are selected to be at least 20% different to each other.

6. The method according to claim 1, wherein the surface roughness is determined on one of the rails by the at least one first sensor.

7. The method according to claim 1, wherein the first measuring arrangement is equipped with at least one second sensor and during the displacement of the measuring carriage along the rails the relative displacement of the at least one first sensor with respect to the carriage frame of the measuring carriage is determined by the at least one second sensor.

8. The method according to claim 1, wherein during the displacement of the measuring carriage along the rails, the path covered by the measuring carriage is determined by means of a path measuring device of the measuring unit.

9. The method according to claim 8, wherein the path measuring device is formed or defined by its own path measuring wheel and/or by one of the wheels and/or by the at least one support wheel which forms the supporting device.

10. The method according to claim 1, wherein the measuring unit is further equipped with at least a second measuring arrangement and the second measuring arrangement is configured identically to the first measuring arrangement and, in each case, the surface condition of at least one of the two rails is determined by the two measuring arrangements.

11. The method according to claim 1, wherein the determination of the surface condition is performed immediately following a machining process on the at least one rail.

12. The method according to claim 1, wherein the measurement base carrier is guided by means of the guide arrangement in a displaceable way in a normal alignment with respect to the respective rail plane relative to the carriage frame.

13. A measuring system for determining the surface condition on at least one rail head, along a laid railway track formed by two rails, wherein at least one rail plane is defined by the two rails, the measuring system comprising:
a measuring carriage with a carriage frame and rotatably mounted wheels on the carriage frame, wherein the carriage frame is supportable by means of the wheels on at least one of the rails and is displaceable along the rails,
a measuring unit with at least a first measuring arrangement with a measurement base carrier, a guide arrangement and at least one first sensor, said at least one first sensor being arranged on the measurement base carrier and the guide arrangement being arranged on the carriage frame for performing a determination of surface condition,
wherein the measurement base carrier including the at least one first sensor for determining the surface condition is mechanically supportable on the at least one rail by means of a supporting device, and
during the displacement of the measuring carriage, the at least one first sensor can be constantly guided at a predetermined, fixed distance above the rail by means of the supporting device and with respect to the respective support position of the supporting device on the rail,
wherein the wheels are arranged in pairs one behind the other on the measuring carriage in the direction of travel of the measuring carriage and of these a first and at least a second pair of wheels is formed, wherein the first pair of wheels is arranged at a first axial spacing from one another in the direction of travel of the measuring carriage and the second pair of wheels is arranged in the same direction at a second axial spacing from one another and wherein the ratio of the two axial spacings to one another does not form a natural number.

14. The measuring system according to claim 13, wherein the supporting device for the measurement base carrier comprises at least one support wheel.

15. The measuring system according to claim 14, wherein the at least one support wheel is formed by a ball bearing and the ball bearing is provided with a damping layer on its circumferential outer surface.

16. The measuring system according to claim 13, wherein the wheels of the measuring carriage are formed by ball bearings and the ball bearings are provided with a damping layer on their circumferential outer surface.

17. The measuring system according to claim 13, wherein the first axial spacing and the second axial spacing are selected to be at least 20% different to each other.

18. The measuring system according to claim 13, wherein the at least one first sensor is configured to determine the surface roughness on one of the rails.

19. The measuring system according to claim 13, wherein the first measuring arrangement comprises at least one second sensor and the at least one second sensor is configured to determine the relative displacement of the at least one first sensor with respect to the carriage frame of the measuring carriage during the displacement of the measuring carriage along the rails.

20. The measuring system according to claim 13, wherein the measuring unit further comprises a path measuring device and the path measuring device is configured to determine the path covered by the measuring carriage during the displacement of the measuring carriage along the rails.

21. The measuring system according to claim 13, wherein the measuring unit further comprises at least a second measuring arrangement and the second measuring arrangement is configured identically to the first measuring arrangement.

22. The measuring system according to claim 13, wherein the measurement base carrier is guided by means of the guide arrangement in a displaceable way in a normal alignment with respect to the respective rail plane relative to the carriage frame.

* * * * *

UNITED STATES PATENT AND TRADEMARK OFFICE
CERTIFICATE OF CORRECTION

| | | |
|---|---|---|
| PATENT NO. | : 12,434,748 B2 | Page 1 of 1 |
| APPLICATION NO. | : 18/289442 | |
| DATED | : October 7, 2025 | |
| INVENTOR(S) | : Moritz Lackner et al. | |

It is certified that error appears in the above-identified patent and that said Letters Patent is hereby corrected as shown below:

On the Title Page

Item (72), Line 1, change: "Moritz Lackner, Steyrermuehl (AT)" to correctly read: -- Moritz Lackner, Scharnstein (AT) --

Item (72), Line 2, change: "Daniel Ludwig Mihalic, Scharnstein (AT)" to correctly read: -- Daniel Ludwig Mihalic, Steyrermuehl (AT) --

Signed and Sealed this
Eighteenth Day of November, 2025

John A. Squires
*Director of the United States Patent and Trademark Office*